US011470088B2

(12) United States Patent
Monica et al.

(10) Patent No.: US 11,470,088 B2
(45) Date of Patent: Oct. 11, 2022

(54) AUGMENTED REALITY DEPOSIT ADDRESS VERIFICATION

(71) Applicant: Anchor Labs, Inc., San Francisco, CA (US)

(72) Inventors: Diogo Monica, San Francisco, CA (US); Nathan P. McCauley, San Francisco, CA (US); Riyaz D. Faizullabhoy, Los Altos, CA (US); Boaz Avital, San Francisco, CA (US)

(73) Assignee: Anchor Labs, Inc., San Francisco, CA (US)

( * ) Notice: Subject to any disclaimer, the term of this patent is extended or adjusted under 35 U.S.C. 154(b) by 280 days.

(21) Appl. No.: 16/354,956

(22) Filed: Mar. 15, 2019

(65) Prior Publication Data

US 2020/0234278 A1    Jul. 23, 2020

Related U.S. Application Data

(60) Provisional application No. 62/794,295, filed on Jan. 18, 2019.

(51) Int. Cl.
*H04L 9/14* (2006.01)
*G06T 11/60* (2006.01)
(Continued)

(52) U.S. Cl.
CPC ....... *H04L 63/102* (2013.01); *G06Q 20/3276* (2013.01); *G06Q 20/3829* (2013.01);
(Continued)

(58) Field of Classification Search
CPC ..... H04L 63/102; H04L 9/14; H04L 63/0861; H04L 9/0861; G06K 7/1417; G06T 11/60
See application file for complete search history.

(56) References Cited

U.S. PATENT DOCUMENTS 9,916,581 B2    3/2018 Dorsey et al.
10,242,477 B1 *  3/2019 Charlton ............... H04L 67/306
(Continued)

FOREIGN PATENT DOCUMENTS

CN          203786754 U  *  8/2014
KR          20190117064      10/2019
WO       WO 2010066304        6/2010

OTHER PUBLICATIONS

Lin et al., Reading between lines: high-rate, non-intrusive visual codes within regular videos via ImplicitCode, Proceedings of the 2015 ACM International Joint Conference on pervasive and ubiquitous computing, Sep. 7, 2015, p. 157-168.*
(Continued)

*Primary Examiner* — Ilse I Immanuel
(74) *Attorney, Agent, or Firm* — Bookoff McAndrews, PLLC (57) ABSTRACT

Methods, systems, and apparatus, including computer programs encoded on computer storage media, for deposit address verification. One method includes receiving a request for the provisioning of an address for depositing digital assets to an account; determining a deposit address attached to the account; forwarding data representing the determined deposit address to a first user device comprising a display for displaying a visual code that encodes the determined deposit address, and to a second user device comprising a camera and an application that displays an image of the visual code overlaid on a live video feed from the second user device camera, wherein when a user directs the second user device camera at the first user device display the visual code on the first user device display can be aligned with the image of the visual code on the live video feed on the second user device.

13 Claims, 7 Drawing Sheets

(51) Int. Cl.
*H04L 9/40* (2022.01)
*H04L 9/32* (2006.01)
*G06Q 20/32* (2012.01)
*G06Q 20/38* (2012.01)
*G06K 7/14* (2006.01)

(52) U.S. Cl.
CPC ............... *G06T 11/60* (2013.01); *H04L 9/14* (2013.01); *H04L 9/3213* (2013.01); *H04L 63/0807* (2013.01); *H04L 63/0861* (2013.01); *G06K 7/1417* (2013.01); *G06Q 2220/00* (2013.01)

(56) References Cited

U.S. PATENT DOCUMENTS

| | | |
|---|---|---|
| 2014/0156534 A1 | 6/2014 | Quigley et al. |
| 2015/0170112 A1 | 6/2015 | DeCastro |
| 2016/0283920 A1 | 9/2016 | Fisher et al. |
| 2017/0154331 A1 | 6/2017 | Voorhees |
| 2017/0373849 A1 | 12/2017 | Donner et al. |
| 2018/0130158 A1 | 5/2018 | Atkinson et al. |
| 2018/0131976 A1* | 5/2018 | Zabelin .............. H04N 21/4316 |
| 2020/0045020 A1* | 2/2020 | Soundararajan ........ H04L 9/006 |

OTHER PUBLICATIONS

Cryptomathic.com [online], "Understanding Hardware Security Modules," Sep. 13, 2017, retrieved on Dec. 31, 2018, retrieved from: URL<https:www.cryptomathic.com/news-events/blog/understanding-hardware-security-modules-hsms>, 10 pages.

Monica, "Crypto Anchors: Exfiltration Resistant Infrastructure," 11 pages, dated Oct. 8, 2017.

Monica, "Increasing Attacker Cost Using Immutable Infrastructure," 8 pages, dated Nov. 19, 2016.

Monica, "The two metrics that matter for host security," 6 pages, dated Aug. 31, 2017.

Wired.com [online], "Crypto anchors' might stop the next Equifax-style megabreach," Oct. 11, 2017, retrieved from: URLhttps://www.wired.com/story/crypto-anchors-breach-security/>, 11 pages.

PCT International Search Report in International Appln. No. PCT/US2019/060907, dated Feb. 24, 2020, 13 pages.

* cited by examiner

AUGMENTED REALITY DEPOSIT ADDRESS VERIFICATION

CROSS-REFERENCE TO RELATED APPLICATIONS

This application claims the benefit under 35 U.S.C. § 119(e) of the filing date of U.S. Patent Application No. 62/794,295, for DIGITAL ASSET CUSTODIAL SYSTEM, which was filed on Jan. 18, 2019, and which is incorporated herein by reference in its entirety.

BACKGROUND

This specification relates to computer systems, and more particularly, to a computer-implemented system for maintaining custody of and access to digital assets, such as cryptocurrencies.

Cryptocurrencies are digital assets designed to work as a medium of exchange that uses cryptography to secure financial transactions, control the creation of additional units, and verify the transfer of assets. Cryptocurrencies can use decentralized control as opposed to centralized digital currency and central banking systems. The decentralized control of cryptocurrency works through distributed ledger technology, typically a blockchain, that serves as a public financial transaction database.

SUMMARY

This specification describes technologies for verifying digital asset addresses provided to clients for use in interacting with, e.g., depositing, digital assets in a digital asset account.

In general, one innovative aspect of the subject matter described in this specification can be embodied in methods that include the actions of: receiving a request for the provisioning of an address for use in depositing digital assets to an account; determining a deposit address uniquely attached to the account; forwarding data representing the determined deposit address to a first user computing device, the first user computing device comprising a display for displaying a visual code generated based on visual code data that encodes the determined deposit address; and forwarding data representing the determined deposit address to a second user computing device, the second user computing device comprising a camera and an application that displays an image of the visual code overlaid on a live video feed from the second user computing device camera, wherein when a user directs the second user computing device camera at the first user computing device display the visual code on the first user computing device display can be aligned with the image of the visual code on the live video feed on the second user computing device.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination.

In some embodiments the method further comprises generating the data representing the determined deposit address; and signing the generated data representing the determined deposit address with a private key.

In some embodiments the data representing the determined deposit address comprises a plaintext representation of the determined deposit address, and wherein the first user computing device and the second user computing device encode the plaintext representation as the visual code data.

In some embodiments the first user computing device and the second user computing device encode the plaintext representation of the determined deposit address as visual code data in response to verifying a signature of the determined deposit address.

In some embodiments the image of the visual code on the live video feed on the second user computing device comprises a low-opacity image.

In some embodiments the visual code displayed on the first user computing device comprises a first colour, and wherein the image of the visual code on the live video feed on the second user computing device comprises a second colour different to the first colour.

In some embodiments the visual code is a QR code.

In some embodiments the second user computing device is a mobile phone.

In some embodiments the mobile phone has a secure enclave.

In general, another innovative aspect of the subject matter described in this specification can be embodied in methods that include the actions of: receiving, at a second user computing device comprising a camera, data representing a deposit address uniquely attached to a user account, wherein the deposit address comprises a deposit address determined in response to receiving a request for the provisioning of an address for use in depositing digital assets to the user account; encoding the data representing the deposit address as visual code data; displaying, by the second user computing device, an image of a visual code generated based on the visual code data overlaid on a live video feed from the second user computing device camera, wherein when a user directs the second user computing device camera at a first user computing device display showing the visual code, the visual code on the first user computing device display can be aligned with the image of the visual code on the live video feed on the second user computing device.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination.

In some embodiments the received data representing the deposit address comprises a signature, and wherein the method further comprises verifying the signature using a public key.

In some embodiments the method further comprises forwarding confirmation data to an external system handling the deposit of digital assets to the user account, wherein the confirmation data comprises data requesting the external system to proceed with depositing digital assets to the user account using the determined deposit address.

In some embodiments the image of the visual code on the live video feed comprises a low-opacity image.

In some embodiments the visual code displayed on the first user computing device comprises a first colour, and wherein the image of the visual code on the live video feed on the second user computing device comprises a second colour different to the first colour.

In some embodiments the visual code is a QR code.

In some embodiments the second user computing device comprises an augmented reality application that displays an image of a visual code overlaid on a live video feed from the second user computing device camera.

In some embodiments the second computing device is a mobile phone.

In some embodiments the mobile phone has a secure enclave.

The subject matter described in this specification can be implemented in particular embodiments so as to realize one or more of the following advantages.

A system implementing the techniques for verifying digital asset addresses described in this specification can achieve increased security posture.

In particular, the techniques described in this specification enable users of the system to verify asset transactions, e.g., to confirm that cryptoassets should be deposited to a specified deposit address, before the transactions are completed. As well as providing extra reassurance and confidence for the user that the user is depositing assets into the correct account, and therefore improving user experience, user verification of transactions prior to completion can reduce the likelihood of a fraudulent transaction succeeding. For example, by utilizing two separate systems on respective devices to verify a deposit address, embodiments of the present specification significantly reduce the likelihood of an attacker successfully causing a user to deposit assets in a fake account. Embodiments of the present specification reduce the likelihood of such an attack because, e.g., the attacker would have to tamper with at least two user systems or try to attack custodial system computing resources directly.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes systems and methods for using augmented reality technology to verify digital asset addresses provided to clients for use in digital asset deposits.

A client (also referred to herein as a user) requests the provisioning of an address for use in depositing digital assets to her account. A cryptoasset custodial system provisions a deposit address for the client and uniquely associates the provisioned address to the client account. The client retrieves the provisioned address, and performs a verification process to confirm that the received address has not been tampered with and is identical to the address provisioned and controlled by the cryptoasset custodial system.

The verification process includes loading a visual code, encoding the provisioned deposit address, for display on a client dashboard. The client dashboard allows a client to view account activity using a first client device. The visual code encoding of the provisioned deposit address is also loaded, e.g., at a different time from the visual code loading into the first client device, in an Application, e.g., an iOS application, using a second client device, e.g., a mobile device.

In certain embodiments, the iOS Application displays its copy of the deposit address visual code as a static, low-opacity image overlaid on a live video feed from the camera of the second client device. By directing the second device's camera at the client dashboard displayed on the first client device, and positioning the camera such that the visual code rendered on the client dashboard aligns with the visual code overlaid on the video feed of the mobile device, the client can get a sense for herself that the visual codes overlaid against each other are identical and then confirm that she wants to proceed with the transaction, e.g., by signing the code with a secure encryption key.

In other embodiments, e.g., where the second client device is a transparent tablet, the iOS Application displays its copy of the deposit address visual code as a low-opacity image. By directing the transparent tablet at the client dashboard displayed on the first client device, and positioning the transparent tablet such that the visual code rendered on the client dashboard aligns with the visual code displayed on the transparent tablet, the client can get a sense for herself that the visual codes overlaid against each other are identical and then confirm that she wants to proceed with the transaction, e.g., by signing the code with a secure encryption key.

In some embodiments the verification process can include loading an audio encoding of the provisioned deposit address to the client dashboard on the first client device. The audio encoding of the provisioned deposit address can also be loaded, e.g., at a different time from the audio loading into the first client device, to a second client device, e.g., a mobile device. By playing both audio encodings using the first and second device, e.g., simultaneously, the client can get a sense for herself that the audio encodings are identical and then confirm that she wants to proceed with the transaction, e.g., by signing the code with a secure encryption key.

Figure 1:
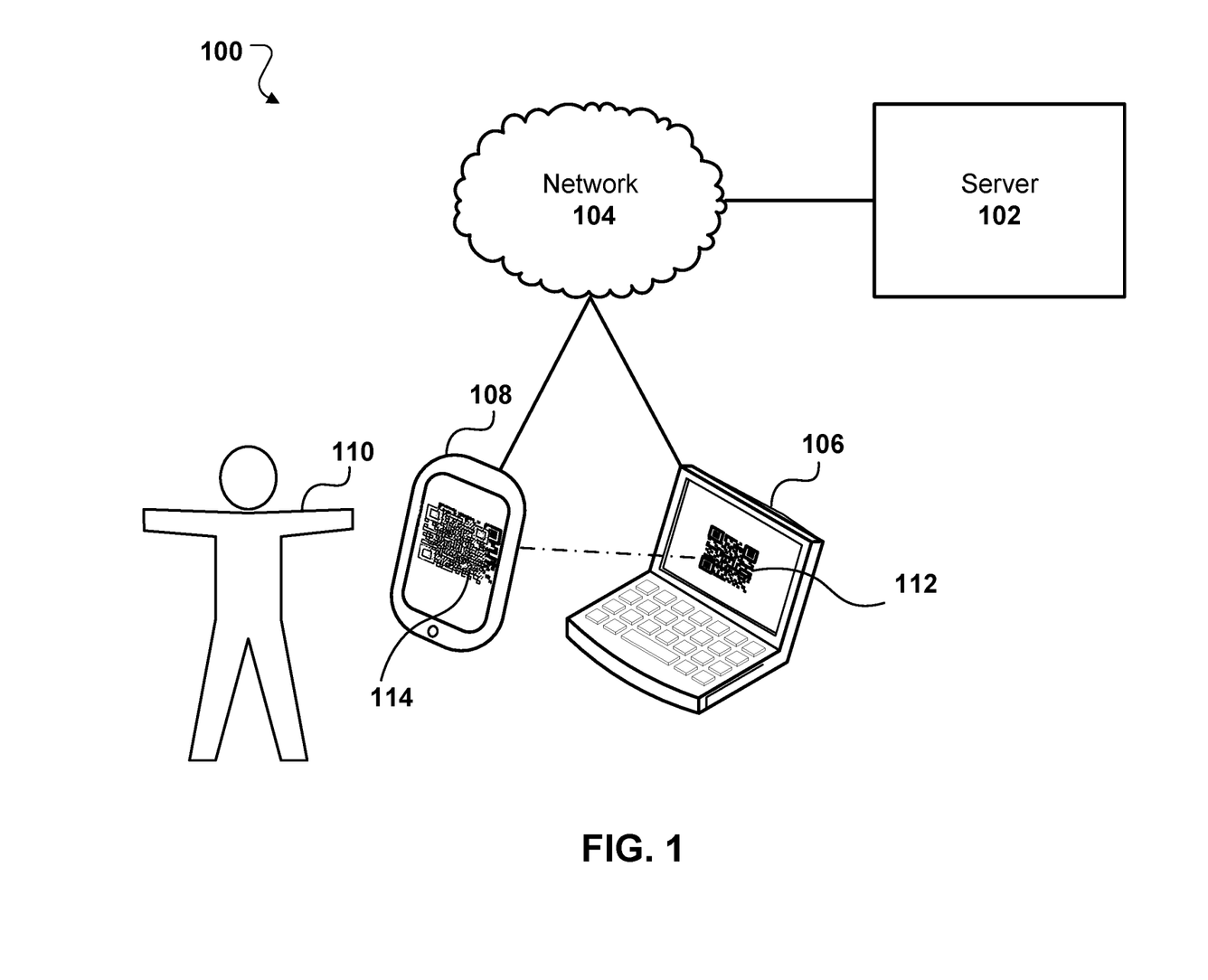
FIG. 1 depicts a high-level block diagram of an example system for verifying digital asset deposit addresses.

FIG. 1 depicts a high-level block diagram of an example system 100 for verifying digital asset deposit addresses. The system 100 includes a server 102 that is in data communication with user devices 106 and 108 through a network 104. The user devices 106 and 108 are associated with an individual user 110. As shown in FIG. 1, in some implementations the user device 106 may be a laptop computer and the user device 108 may be a smartphone. However, in other implementations the user device 106 or 108 may be any one of a tablet computer, a smartphone, a media player, an electronic book reader, or other suitable device.

The server 102 is a data processing and storage device associated with an organization, e.g., a bank, an investment firm, a social media company, or a service provider for various services, such as a utility, an online communication service provider, or a telecommunications service provider. In some implementations, the organization may be a cryptoasset custodian, and components of the system 100 may correspond to a cryptoasset custodial system (CCS). An example CCS is described in more detail below with reference to FIG. 2.

Although only one server 102 is shown in FIG. 1, in some implementations the system 100 may include multiple servers that are associated with the organization. These servers perform various functions for the organization, including processing user requested transactions involving digital assets, e.g., deposits of cryptocurrency funds.

The user 110 has a user account with the organization associated with the server 102. In some implementations, the user 110 may be a client of the organization and may have a client account with the organization. For example, the user 110 may be a client of a cryptoasset custodian and may have a custodial account for conducting cryptoasset transactions. Alternatively, the user 110 may be a client of a bank or investment firm and may have a bank account or investment account for conducting cryptoasset transactions.

The user 110 can access the user account maintained with the organization and perform account transactions by accessing the user account remotely. For example, the user may access the user account through a browser based web application running on a first user device, e.g., user device 106. Once in the user accesses the user account, the user can initiate and complete account transactions such as account withdrawals or deposits. An example process for depositing digital assets in a custodian account is described in more detail below with reference to FIGS. 2 and 3.

To increase the security of account transactions, the user 110 may use multiple user devices when performing an account transaction. For example, the user 110 may initiate a transaction using a first user device, e.g., user device 106, and validate the transaction using a second user device, e.g., user device 108, before the transaction is completed. In these examples the second user device can include a camera.

In the case of account deposits, a user can initiate a deposit by accessing the organization's browser based web application with user device 106 and requesting the provisioning of an address for use in depositing assets to a user account from an external system. In certain embodiments the user 110 then receives a visual code representation, e.g., a QR code encoding 112, of an address for the deposit through the browser based web application and/or through a phone application, as described below.

To validate the address, the user 110 may open an augmented reality application, e.g., an iOS augmented reality application (that can either be installed on the user device specifically for validating address or can be an existing phone application), using user device 108 and display an image of the visual code representation of the address, e.g., QR code 114, overlaid on a live video feed from user device 108's camera. By directing user device 108's camera at user device 106's display, the visual code representation 112 displayed on user device 106 can be aligned with the visual code representation 114 on the live video feed on user device 108.

If the user, and/or the application on the second client device, determines that the visual code representations 112 and 114 match, the user 110 can confirm that the address provided by the organization has not been tampered with and is accurate. The user 110 can then complete the transaction, e.g., by confirming the transaction through the browser based web application. If the user, and/or the application on the second client device, determines that the visual code representations 112 and 114 do not match, the user 110 can decline to complete the deposit and can report suspicious activity to the organization, e.g., through the browser based web application.

Communications between the server 102, user device 106 and user device 108 occur through the network 104. In some implementations the network 104 may be a local area network (LAN), such as a Wi-Fi or Ethernet network in a building. In other implementations the network 104 may be a wide area network (WAN), such as a cellular network, a fiber optic or cable network, or a combination of these. In some implementations, the network 104 may be a combination of a LAN and a WAN. The network 104 may include the Internet.

Figure 2:
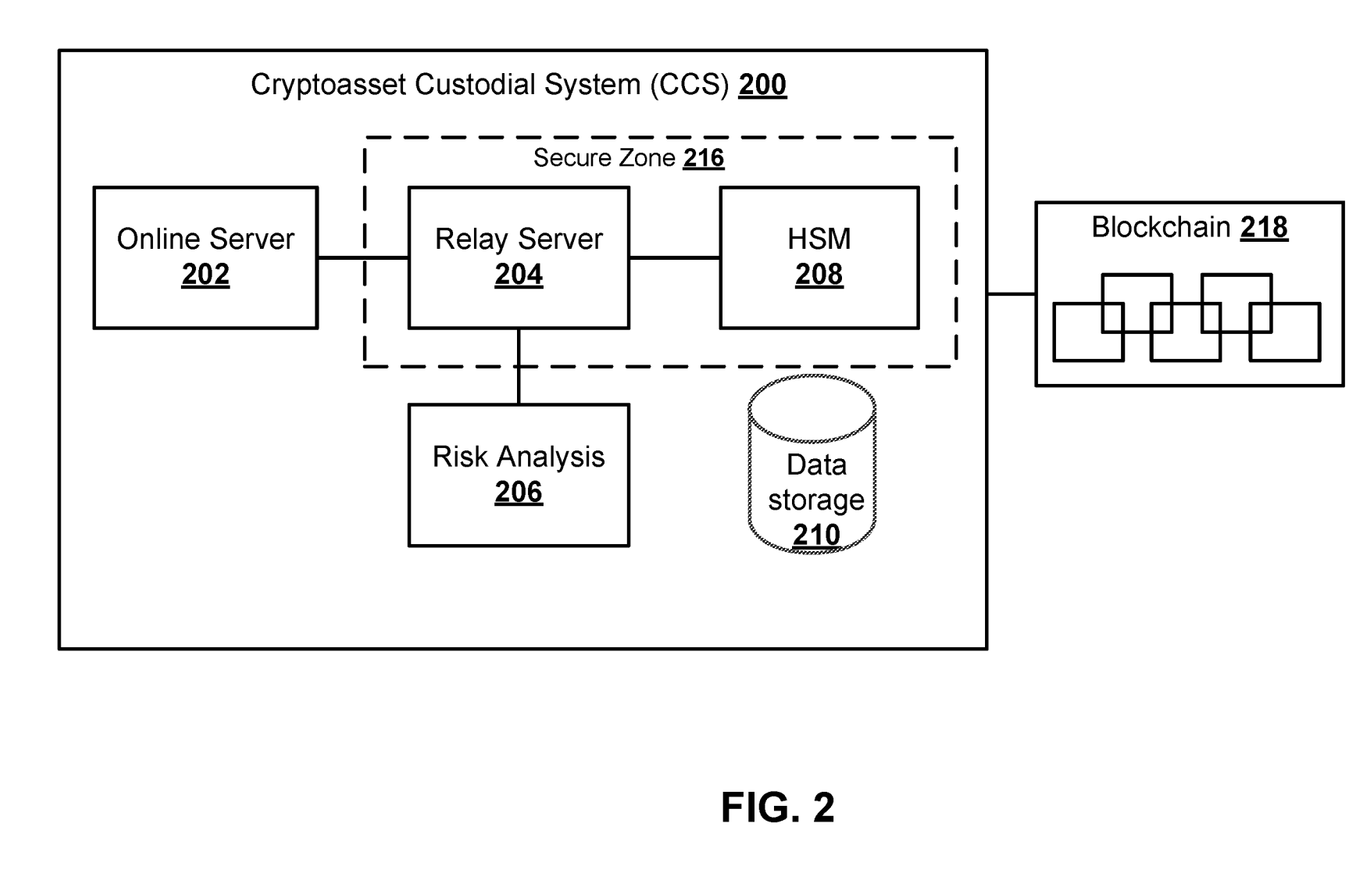
FIG. 2 depicts a conceptual block diagram of an example cryptoasset custodial system (CCS).

As described above, in some implementations the system 100 may correspond to a cryptoasset custodial system (CCS). A CCS is a computer-implemented system for maintaining custody of and controlling access to digital assets such as cryptocurrencies. FIG. 2 depicts a block diagram of an example cryptoasset custodial system (CCS) 200. The example CCS 200 includes multiple layers of security that enable cryptoassets to be maintained in a secure manner. For example, the CCS 200 includes an online server 202, a relay server 204, a risk analysis stage 206, a hardware security module (HSM) 208, and a data storage facility 210. The data storage facility 210 may include one or more databases, which can be, or include, relational databases or any other type of mechanism for storing data in an organized way, where the data may be structured data and/or unstructured data. Although not shown in FIG. 2, the HSM 208 may also include its own internal secure storage facility. For convenience, each of the above components of the CCS are illustrated once in FIG. 2, however in some implementations the CCS may include multiple instances of each component.

Users of the CCS can communicate with the CCS via a public network, e.g., the internet. For example, the online server 202 may be similar in functionality to the server 102 of FIG. 1, and provide a system to process user requests for secure online access to user accounts administered by the CCS 200.

When a user of the CCS requests a transaction involving a cryptoasset, such as a deposit of cryptoassets, the CCS can cause an endorsement request message to be sent to multiple user devices, each of which is associated with a different user who has been defined as potential member of a quorum for transactions involving that cryptoasset (in other implementations, multiple users may share the same user device). The endorsement request message is configured to cause each receiving user device to prompt its user to provide an endorsement of the requested transaction. An endorsement in this context is an approval, or rejection, of an operation by a user. When a user receiving such a prompt endorses the transaction on his or her user device (e.g., a smartphone, tablet or notebook computer), the user device signs an endorsement message with a private key of that user and transmits the signed endorsement message to the CCS. The private key may be stored within a secure enclave within the user device. A secure enclave in each user device may be used to store the corresponding user's private key and to generate digital signatures of that user. The relay server 204 can be configured to function as a virtual air gap to isolate the HSM 208 from the public network. The relay server 204 and HSM 208 operate within a secure zone 216. In some implementations the HSM 208 may physically reside in a physically secured datacenter with no direct access to any outside network. Messages between the HSM 208 and the online server 202 may be routed on a half-duplex (outbound request-responses only) connection to the relay server 204 in the secure zone 216. The relay server 204 disconnects itself from the secure network while communicating with the online server 202, and disconnects itself from all external networks while communicating with the HSM 208, such that no interactive sessions with those devices can be established from the outside. This provides virtual "air gap" security to critical infrastructure.

The HSM 208 can be a special-purpose physical computing device that safeguards and manages digital keys for authentication and provides cryptoprocessing functionality. The HSM 208 can be embodied as a plug-in card or an external device that attaches directly to a computer.

The HSM 208 can be configured to determine whether a policy-based quorum of multiple users has endorsed (approved) a requested action, such as a withdrawal or transfer of cryptocurrency funds. The HSM can validate an endorser approved signature by a public key of a public-private key pair for each of the plurality of endorsers, the signature residing in an endorsement message received from the endorsers. Only after determining that the policy-based quorum of the multiple users has validly endorsed the requested action, does the HSM 208 allow itself to access the private key of that particular cryptographic asset (e.g., for a specific deposit of cryptocurrency funds), which the HSM 208 previously generated, and use that private key to sign the transaction as authorization that the transaction may proceed. In certain embodiments the private key for that cryptoasset is stored only in the HSM 208, which does not permit the key to be read by any entity outside the HSM.

In some implementations transactions submitted by a user of the CCS 200 may be processed through the risk analysis stage 206, which may be partially or fully automated. For example, in some implementations of the CCS 200, a human risk analysis agent may evaluate the output of automated risk analysis software displayed on a risk review dashboard to make a decision on whether a transaction has been sufficiently authorized to be accepted. The risk analysis agent or the software can follow a policy set on each individual vault and can look at any of various risk signals (e.g., the amount being transacted, how many users have authorized this transaction, the location(s) from which the transaction was requested and approved, the destination address) to compute a final risk score that might lead to the transaction being approved or more information being requested.

In certain embodiments, approval of the transaction by the HSM 208 occurs only if and after the requested transaction has passed a risk review, which may be partially or fully automated.

In some implementations the CCS 200 may also have access to one or more blockchain networks, e.g., blockchain network 218, corresponding to cryptoassets of which the CCS 200 has custody. Access to a blockchain network, e.g., blockchain network 218, may be provided via the public network.

Figure 3:
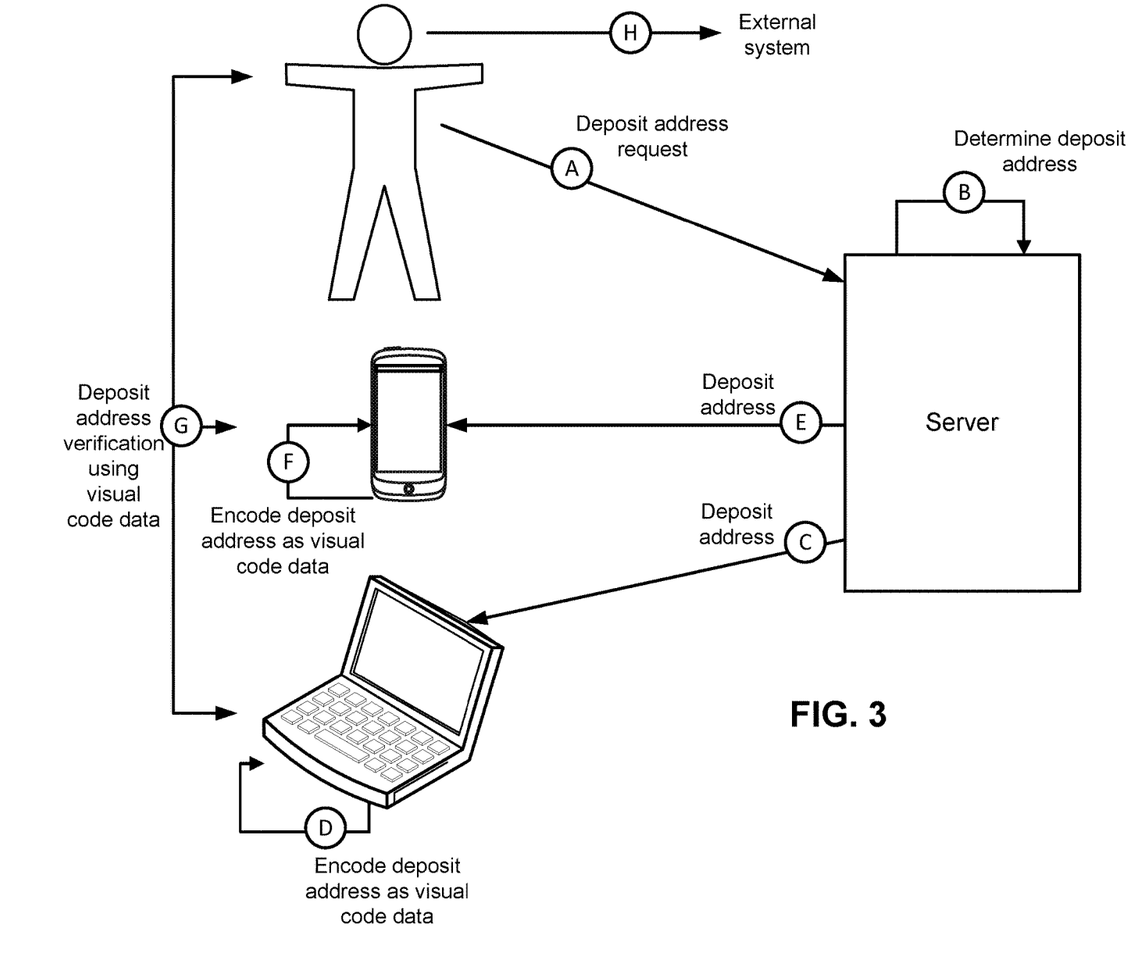
FIG. 3 depicts a conceptual block diagram of an example process for initiating deposit of digital assets to a user account.

FIG. 3 depicts a conceptual block diagram 300 of an example computing system performing an example process for depositing digital assets to a user account. For example, the example computing system 100 of FIG. 1 can perform the example process.

During stage (A) of the process for depositing digital assets to a user account, a user sends a request for the provisioning of an address for use in depositing digital assets to an account to a server. For example, referring to FIGS. 1 and 2, a user 110 may send a request to the online server 202 included in the CCS 200 for the provisioning of an address for use in depositing an amount of cryptocurrency to a user account using an external system. The user 110 can send the request to the server via a network, e.g., network 114, through a browser based web application executing on a first user device 106. Sending the request may include selecting an asset type and requesting a deposit for a given amount of cryptoassets in the web application.

The server receives the request for the provisioning of an address for use in depositing digital assets to an account from the user. During stage (B) of the process for depositing digital assets to a user account, the server determines a deposit address uniquely attached to the user account. In cases where the server includes or is part of the CCS of FIG. 2, determining a deposit address uniquely attached to the user account may include forwarding the received request via the relay server 204 to the HSM 208. The HSM 208 may then generate a new public-private key pair to correspond uniquely with the deposit, i.e., to correspond with the requested address. In some implementations, the HSM 208 may use the private key of the corresponding organization and a key derivation function to generate the new key pair for the address, where a corresponding organization in this context is a data structure that corresponds to a particular user. In these implementations, the private key of the newly generated key pair cannot be extracted from the HSM 208, but can be backed up securely in an encrypted file. Key generation inside the HSM 208 according to these implementations ensures that the private keys only exist within the HSM 208, are not available anywhere else in the world, and are not be accessed by an unauthorized entity that is external to the HSM 208.

The HSM 208 can then generate the address for the deposit from the public key of the newly-created key pair. The HSM can generate this address by using blockchain-specific transformations of the public key of the address. The HSM 208 can then sign the address with the organization's private key and return the signed address to the online server 202.

During stage (C) of the process for depositing digital assets to a user account, the server forwards the determined deposit address to the first user device. For example, the server can forward data representing a plaintext deposit address that was signed by the HSM to the first user device.

The first user device may use the browser based web application to verify the signature of the determined deposit address before presenting the address to the user. This may include using the public key of the organization (which it previously received from the server and is locally stored) to verify the authenticity of the determined address.

During stage (D) of the process for depositing digital assets to a user account, if the first user device verifies the authenticity of the determined address, the first user device uses the browser based web application to encode the determined deposit address as visual code data. For example, the first user device may encode the determined deposit address in a QR code, since QR codes are a common and convenient medium for sharing cryptoasset addresses.

During stage (E) of the process for depositing digital assets to a user account, the server forwards the determined deposit address to a second user device. For example, the server can forward data representing a plaintext deposit address that was signed by the HSM to the second user device. In some embodiments stage (E) can be performed in parallel with stage (C) described above. In other embodiments the server can forward the determined deposit address to the user before or after stage (C). The second user device may use the browser based web application to verify the signature of the determined deposit address. This may include using the public key of the organization (which it previously received from the server and locally stored) to verify the authenticity of the determined address. Since both the first user device and second user device verify the signature of the determined deposit address, both devices can independently verify that the address was not tampered with in transit from the HSM 208 to the respective device.

In some implementations the server may forward an image file or already-rendered QR code to the first user device or to the second user device at stages (C) or (E). In these implementations the HSM may have signed the received image file or QR code, and the first or second user device can verify the signature as described above before providing the first or second user device with the image file or QR code. Alternatively, if the HSM has not signed the received image file or QR code, the first or second user device may convert the image file or QR code back to a plaintext format to check the signature of the plaintext deposit address. If the signature is verified, the first or second user device can re-encode the plaintext deposit address into an image file or QR code.

During stage (F) of the process for depositing digital assets to a user account, if the second user device verifies the authenticity of the determined address, the second user device uses the browser based web application to encode the determined deposit address as visual code data, e.g., as a QR code.

In some implementations, an augmented reality application installed on the second user device receives the visual code. The augmented reality application can display an image of a visual code overlaid on a live video feed from a camera of device on which it is installed. In some implementations the image of the visual code may be a low-opacity image.

During stage (G) of the process for depositing digital assets to a user account, the user uses the first user device and second user device to determine if she wants to proceed with the transaction, e.g., verify the determined deposit address.

Figure 4:
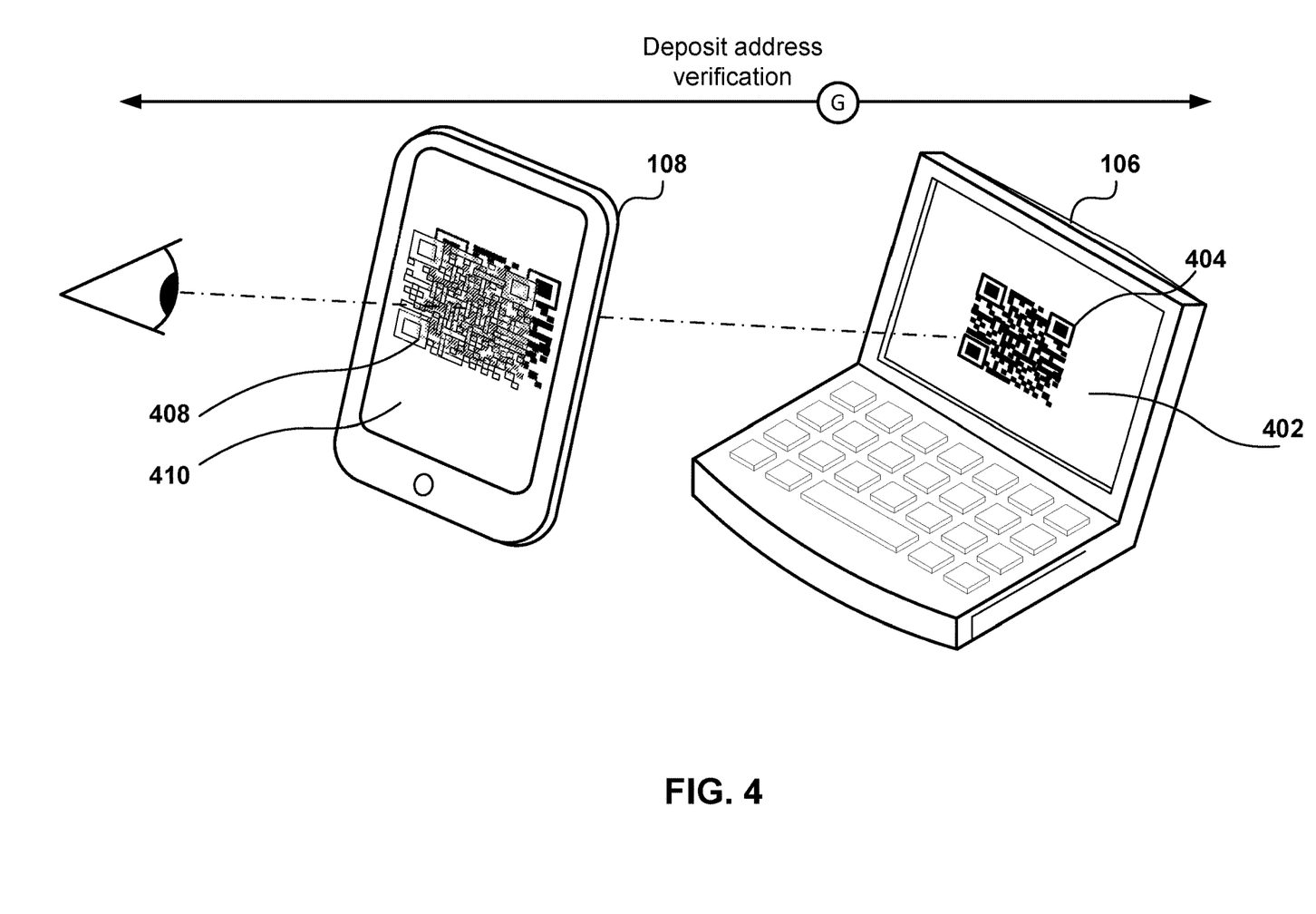
FIG. 4 is an illustration of an example process for verifying a provisioned deposit address.

FIG. 4 is an illustration 400 of an example process for verifying a determined deposit address. For convenience, FIG. 4 shows an example process for verifying a determined deposit address using QR codes, however in some implementations other images or encodings may be used. In addition, for clarity, FIG. 4 shows the second user device displaying 50% opacity image of a QR code. However, in some implementations other opacities may be used, e.g., an opacity between 5% and 25%. Alternatively or in addition, in some implementations the first user device may display an image of a QR code in a first colour and the second user device may display an image of a QR code in a second colour that is different to the first colour. The use of differing opacities and/or colours used by the first user device and second user device can assist the user's determination of whether the visual codes match or not, as described below.

The verification process includes causing the display 402 of the first user device 106 to display a visual code 404 corresponding to the visual code data generated at stage (D) of the process for depositing digital assets to a user account. The user can then run the augmented reality application on the second user device 108 and direct the second user device camera at the first computing device display 402 to align the streamed image of the visual code 404 displayed on the first user device 106 with the image 408 of the visual code shown on the display of the second device 410. By aligning the visual codes 404, 408 in this manner, the user may determine whether the visual codes match or not. In some implementations this determination may be performed manually, as shown in FIG. 4.

In other implementations additional software installed on the second user device may perform the determination in addition to or independent of a user's determination. For example, augmented reality techniques may not be needed if the user does not want to verify the visual code between the two devices, and if they instead are satisfied with using one system to check the other. For example, the second user device could be used to scan the code presented on the first user device and verify that the address displayed by the first device matches the address the second device has received from the server. In this case, if the user chooses to use the second device to validate the QR code presented on the first device, the QR code presented on the first device must be scanned to prevent counterfeiting by the second device.

If the visual codes 404, 408 match, the user can have greater confidence that the deposit address shown in the browser based web application has not been tampered with and is accurate relative to a similar system that does not include such a verification process. In addition, the user can verify that the first user device or second user device themselves are not producing counterfeit deposit addresses.

Returning to FIG. 3, during stage (H) of the process for depositing digital assets to a user account, in response to verifying the determined deposit address at stage (G) and determining that she wants to proceed with the transaction, the user can provide the deposit address to an external system that the user will be depositing an amount of cryptoasset from. In some cases the user may want to, or be required to by the external system, provide a QR encoding of the deposit address to the external system. In these cases the user may directly scan the QR code into the external system using either the first user device or second user device. This direct scanning can eliminate the possibility that the application on either device swaps the QR code for a counterfeit after the validation process described at stage (H) is performed and before the QR code is input into the external application. The transaction can then be completed by the external system.

Figure 5:
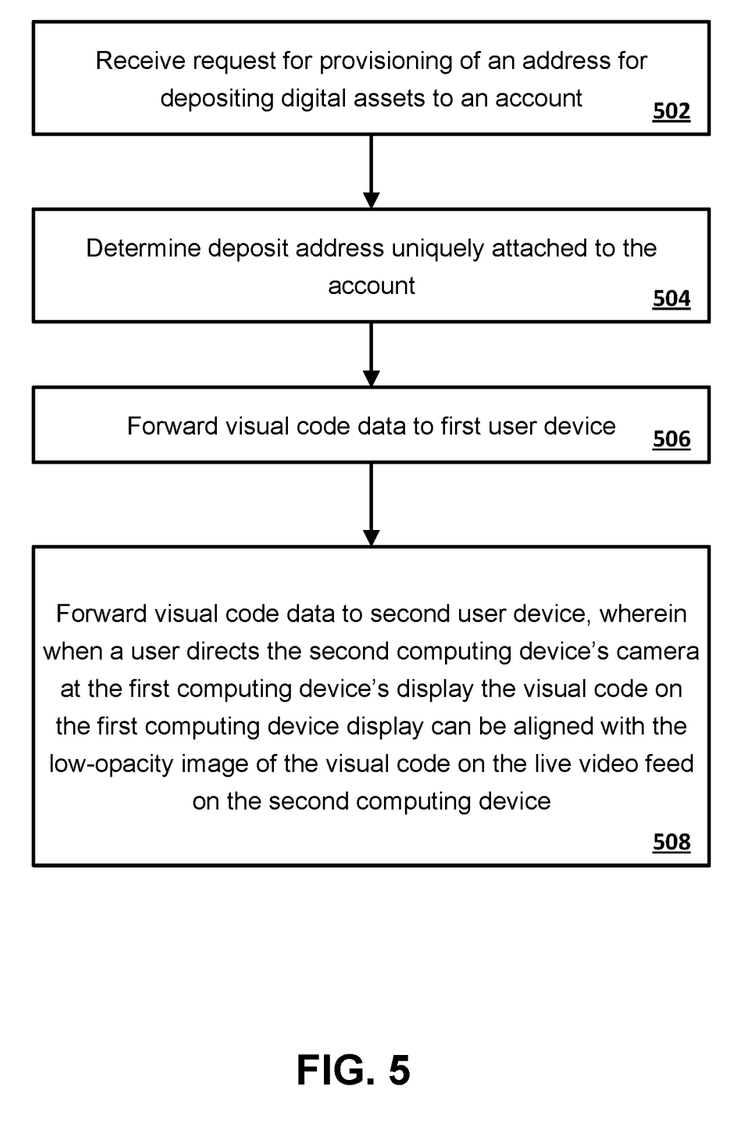
FIGS. 5 and 6 are flow diagrams of example processes for verifying digital asset addresses provided to users for use in depositing digital assets in a digital asset account.

FIG. 5 is a flowchart of an example process 500 for verifying digital asset addresses provided to users for use in depositing digital assets in a digital asset account. For convenience, the process 500 will be described as being performed by a system of one or more computers, located in one or more locations, and programmed appropriately in accordance with this specification. For example, the system 200 100 of FIG. 2, appropriately programmed, can perform the process 500.

The system receives a request for the provisioning of an address for use in depositing digital assets to an account (step 502).

The system determines a deposit address uniquely attached to the account (step 504). The system can generate data representing the determined deposit address, e.g., a plaintext representation of the determined deposit address. In some implementations the system may sign generated data representing the determined deposit address with a private key, as described above with reference to FIG. 3.

The system forwards the generated data representing the determined deposit address to a first user computing device (step 506). In response to receiving the data representing the determined deposit address, the first device may encode the received data as visual code data. Before encoding the received data as visual code data, the first user computing device may verify a signature included in the received data using a public key.

The first user computing device includes a display for displaying a visual code, e.g., a QR code, generated based on the visual code data that encodes the determined deposit address. For example, the first user computing device may be a laptop computer, tablet or mobile phone.

The system forwards data representing the determined deposit address to a second user computing device (step 508). In response to receiving the data representing the determined deposit address, the second device may encode the received data as visual code data. Before encoding the received data as visual code data, the second user computing device may verify a signature included in the received data using a public key.

The second user computing device includes a camera and an application that displays an image of the visual code overlaid on a live video feed from the second user computing device camera. For example, the second user computing device may be a mobile phone.

When a user directs the second user computing device camera at the first user computing device display the visual code on the first user computing device display can be aligned with the image of the visual code on the live video feed on the second user computing device. In some implementations the image of the visual code on the live video feed on the second user computing device includes a low-opacity image, as shown in FIG. 4 above. Alternatively or in addition, the visual code displayed on the first user computing device can be a first colour, and the image of the visual code on the live video feed on the second user computing device can be a second colour different to the first colour.

Figure 6:
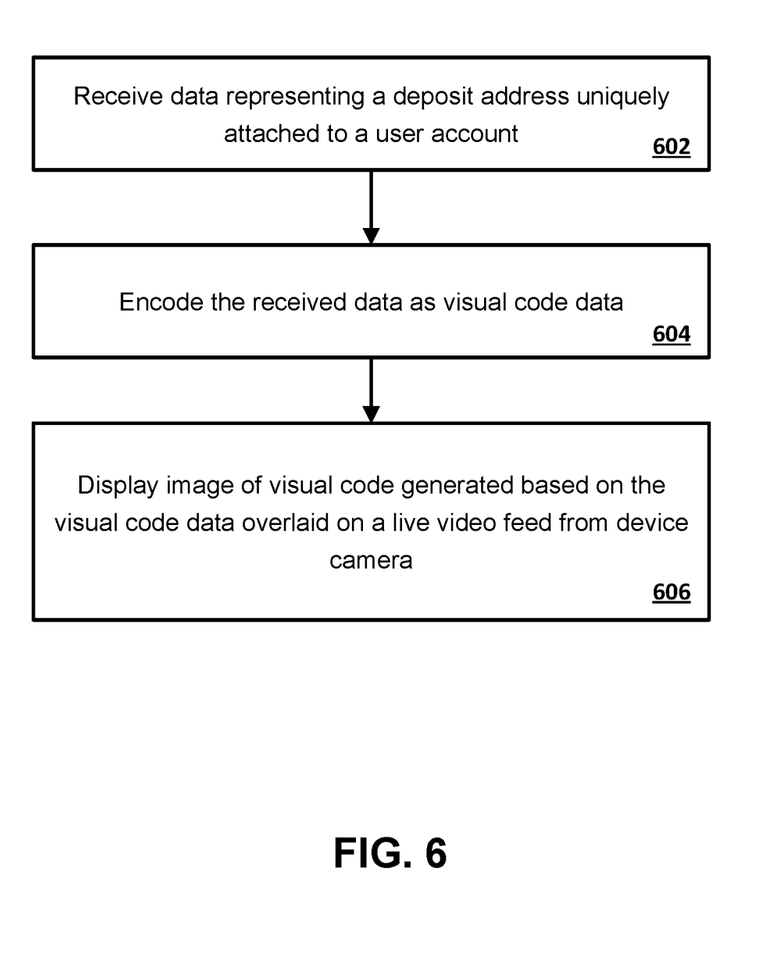

FIG. 6 is a flowchart of an example process 600 for verifying digital asset addresses provided to users for use in depositing digital assets in a digital asset account. For convenience, the process 600 will be described as being performed by a system of one or more computers, located in one or more locations, and programmed appropriately in accordance with this specification. For example, the second user device 108 of FIG. 1, appropriately programmed, can perform the process 600.

The second user device receives data representing a deposit address uniquely attached to a user account (step 602). The deposit address includes a deposit address determined in response to receiving a request for the provisioning of an address for use in depositing digital assets to the user account. The second user device encodes the data representing the deposit address as visual code data, e.g., QR code data (step 604). In some implementations the second user device may verify a signature included in the received data using a public key before encoding the data as visual code data.

The second user device displays an image of a visual code generated based on the visual code data overlaid on a live video feed from the second user computing device camera (step 606).

When a user directs the second user computing device camera at a first user computing device display showing the visual code, the visual code on the first user computing device display can be aligned with the image of the visual code on the live video feed on the second user computing device using an augmented reality application. The image of the visual code on the live video feed may be a low-opacity image. Alternatively or in addition the image of the visual code on the live video feed may be a different colour to the visual code on the first user computing device.

In some implementations the second user device can forward confirmation data to an external system handling the deposit of digital assets to the user account, where the confirmation data includes data requesting the external system to proceed with depositing digital assets to the user account using the determined deposit address.

Figure 7:
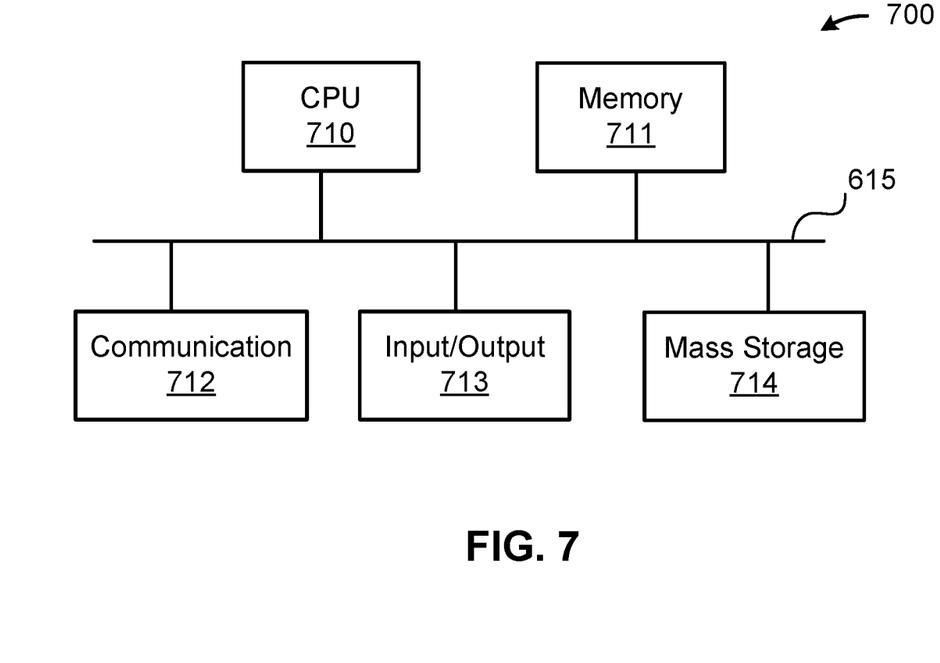
FIG. 7 depicts a high-level block diagram of the hardware architecture of a processing system that can be used to implement some or all of the components of the system for verifying digital asset deposit addresses.

FIG. 7 is a high-level block diagram illustrating an example of a hardware architecture of a device 700 that can be used to implement components of a server, e.g., server 102 of FIGS. 1 and 2, or a user device, e.g., user device 106 or 108.

The device 700 includes one or more processors, including a CPU 710, one or more memories 711 (at least a portion of which may be used as working memory, e.g., random access memory (RAM)), one or more data communication device(s) 712, one or more input/output (I/O) devices 713, and one or more mass storage devices 714.

The components of the device 700 are coupled to each other through an interconnect 715. The interconnect 715 can be, or include, one or more conductive traces, buses, point-to-point connections, controllers, adapters and/or other conventional connection devices.

Each processor 710 controls part of the operation of the device 700 and can be or include, for example, one or more general-purpose programmable microprocessors, digital signal processors (DSPs), mobile application processors, microcontrollers, application specific integrated circuits (ASICs), programmable gate arrays (PGAs), or the like, or a combination of such devices.

Each memory 711 can be or include one or more physical storage devices, which may be in the form of RAM, read-only memory (ROM) (which may be erasable and programmable), flash memory, miniature hard disk drive, or other suitable type of storage device, or a combination of such devices.

Each mass storage device 714 can be, or include, one or more hard drives, digital versatile disks (DVDs), flash memories, or the like. Each memory 711 and/or mass storage 714 can store (individually or collectively) data and instructions that configure the processor(s) 710 to execute operations to implement the techniques described above. Each communication device 712 can be or include, for example, an Ethernet adapter, cable modem, Wi-Fi adapter, cellular transceiver, baseband processor, Bluetooth or Bluetooth Low Energy (BLE) transceiver, or the like, or a combination thereof. Depending on the specific nature and purpose of the device 700, each I/O device 713 can be, or include, a device such as a display (which may include a transparent AR display surface), audio speaker, keyboard, mouse or other pointing device, microphone, camera, etc. In some implementations, e.g., in which the device 700 represents a server computer, such as the server 102 of FIG. 1, such I/O devices may not be present.

In case of a user device, a communication device 712 can be, or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, a communication device 712 can be, or include, for example, any of the aforementioned types of communication interfaces, a wired Ethernet adapter, cable modem, DSL modem, or the like, or a combination of such interfaces.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for improving electronic transaction security comprising:
    receiving, by a server and from a first user computing device over a communication network, a request for an address of a digital asset account configured to receive a deposit of a digital asset;
    identifying, by the server and in response to the request, a deposit address uniquely linked to the digital asset account via a key pair specific to the deposit;
    transmitting, by the server and over the communication network, data representing the identified deposit address to the first user computing device, the first user computing device comprising a display that displays a visual code that encodes the identified deposit address;
    transmitting, by the server and over the communication network, data representing the identified deposit address to a second user computing device, the second user computing device comprising a display and a camera;
    generating, on the second user computing device, an image of the visual code overlaid on a live video feed of the second user computing device camera;
    upon a user aligning the image of the visual code overlaid on the live video feed of the second user computing device display with the visual code displayed on the first user computing device display, authenticating, by the second user computing device, the deposit address based on determining, by the second user computing device, that the aligned image overlaid on the live video feed matches the displayed visual code; and
    transmitting confirmation data, by the second user computing device, to an external system handling deposits of digital assets to the digital asset account, wherein the confirmation data comprises data requesting the external system to proceed with depositing the digital asset to the digital asset account using the identified deposit address.

2. The method of claim 1, further comprising:
    generating, by the server, the data representing the identified deposit address; and
    signing, by the server, the generated data representing the identified deposit address with a private key.

3. The method of claim 1, wherein the data representing the identified deposit address comprises a plaintext representation of the identified deposit address, and wherein the first user computing device and the second user computing device encode the plaintext representation as the visual code.

4. The method of claim 3, wherein the first user computing device and the second user computing device encode the plaintext representation of the identified deposit address as the visual code in response to verifying a signature of the identified deposit address.

5. The method of claim 1, wherein the image of the visual code overlaid on the live video feed of the second user computing device camera comprises a low-opacity image.

6. The method of claim 1, wherein the visual code displayed on the first user computing device comprises a first colour, and wherein the image of the visual code overlaid on the live video feed of the second user computing device camera comprises a second colour different from the first colour.

7. The method of claim 1, wherein the visual code is a QR code.

8. The method of claim 1, wherein the second user computing device is a mobile phone.

9. The method of claim 8, wherein the mobile phone has a secure enclave.

10. The method of claim 1, wherein the second user computing device is configured to execute an augmented reality application thereon to display the image of the visual code overlaid on the live video feed of the second user computing device camera.

11. The method of claim 1, wherein the second computing device is a mobile phone.

12. The method of claim 11, wherein the mobile phone has a secure enclave.

13. A system for improving electronic transaction security, the system comprising a server, a first user computing device, and a second user computing device, the system configured to perform operations comprising:
- receiving, by the server and from the first user computing device over a communication network, a request for an address of a digital asset account configured to receive a deposit of a digital asset;
- identifying, by the server and in response to the request, a deposit address uniquely linked to the digital asset account via a key pair specific to the deposit;
- transmitting, by the server and over the communication network, data representing the identified deposit address to the first user computing device, the first user computing device comprising a display that displays a visual code that-encodes the identified deposit address;
- transmitting, by the server and over the communication network, data representing the identified deposit address to the second user computing device, the second user computing device comprising a display and a camera;
- generating, on the second user computing device, an image of the visual code overlaid on a live video feed of the second user computing device camera;
- upon a user aligning the image of the visual code overlaid on the live video feed of the second user computing device display with the visual code displayed on the first user computing device display, authenticating, by the second user computing device, the deposit address based on determining, by the second user computing device, that the aligned image overlaid on the live video feed matches the displayed visual code; and
- transmitting confirmation data, by the second user computing device, to an external system handling deposits of digital assets to the digital asset account, wherein the confirmation data comprises data requesting the external system to proceed with depositing the digital asset to the digital asset account using the identified deposit address.

* * * * *

UNITED STATES PATENT AND TRADEMARK OFFICE
CERTIFICATE OF CORRECTION

PATENT NO. : 11,470,088 B2
APPLICATION NO. : 16/354956
DATED : October 11, 2022
INVENTOR(S) : Diogo Monica et al.

It is certified that error appears in the above-identified patent and that said Letters Patent is hereby corrected as shown below:

In the Claims

Column (17), Line (20), Claim 13, delete "that-encodes" and insert --that encodes--.

Signed and Sealed this
Thirteenth Day of December, 2022

Katherine Kelly Vidal
*Director of the United States Patent and Trademark Office*